United States Patent
Ayoub et al.

(10) Patent No.: US 11,847,606 B2
(45) Date of Patent: Dec. 19, 2023

(54) SYSTEM AND METHOD FOR CARGO TRANSPORTATION UNIT TRACKING AND MONITORING DEVICE VERIFICATION

(71) Applicant: BlackBerry Limited, Waterloo (CA)

(72) Inventors: Sameh Ayoub, Ottawa (CA); Prabhul Dev, Nepean (CA); Amanda Sarah Klowak, Ottawa (CA); Conrad Delbert Seaman, Ottawa (CA)

(73) Assignee: BlackBerry Limited, Waterloo (CA)

( * ) Notice: Subject to any disclaimer, the term of this patent is extended or adjusted under 35 U.S.C. 154(b) by 277 days.

(21) Appl. No.: 16/399,223

(22) Filed: Apr. 30, 2019

(65) Prior Publication Data
US 2020/0349501 A1 Nov. 5, 2020

(51) Int. Cl.
*G06Q 10/0833* (2023.01)
*G06T 7/70* (2017.01)
*H04N 23/54* (2023.01)
*H04N 23/90* (2023.01)

(52) U.S. Cl.
CPC ........... *G06Q 10/0833* (2013.01); *G06T 7/70* (2017.01); *H04N 23/54* (2023.01); *H04N 23/90* (2023.01)

(58) Field of Classification Search
CPC .... G06T 7/70; G06K 9/00624; G06K 9/2063; H04N 5/2253; H04N 5/247; G06Q 10/087; G06Q 50/28
See application file for complete search history.

(56) References Cited

U.S. PATENT DOCUMENTS

| | | |
|---|---|---|
| 6,356,802 B1 | 3/2002 | Takehara et al. |
| 2003/0191555 A1 | 10/2003 | Takehara et al. |
| 2004/0126015 A1 | 7/2004 | Hadell |
| 2006/0149475 A1 | 7/2006 | Kellum |
| 2006/0257005 A1 | 11/2006 | Bergeron et al. |

(Continued)

FOREIGN PATENT DOCUMENTS

| | | |
|---|---|---|
| WO | 2004058623 A1 | 7/2004 |
| WO | 2018031279 A1 | 2/2018 |
| WO | 2018052583 A1 | 3/2018 |

OTHER PUBLICATIONS

Extended European Search Report for European Patent Application 20172305.3 dated Jul. 7, 2020.

(Continued)

*Primary Examiner* — Jeff Zimmerman
*Assistant Examiner* — Tayar M Kyu
(74) *Attorney, Agent, or Firm* — TROP, PRUNER & HU, P.C.

(57) ABSTRACT

A system and method for providing verification of tracking and monitoring devices with cargo transportation units is provided. The track and monitoring device is mounted to the cargo transportation unit to provide location tracking and security functions. The association process is typical a manual process by a technician of identifying container visual identifiers to the installed tracking and monitoring unit. Errors in the association process can occur during installation and repairs. The association between tracking and monitoring devices and their respective cargo transportation unit is verified by receiving images from one tracking and monitoring device at a server and verifying the cargo transportation unit identifier is associated with another tracking and monitoring device.

20 Claims, 7 Drawing Sheets

(56) References Cited

U.S. PATENT DOCUMENTS

| | | | |
|---|---|---|---|
| 2007/0133980 A1 | 6/2007 | Meyers et al. | |
| 2009/0015400 A1 | 1/2009 | Breed | |
| 2010/0085214 A1 | 4/2010 | Kim | |
| 2014/0267776 A1 | 9/2014 | Duthu | |
| 2016/0047646 A1* | 2/2016 | Ochsendorf | G01C 21/343 348/148 |
| 2018/0348792 A1* | 12/2018 | O'Brien | G05D 1/0088 |
| 2019/0026915 A1 | 1/2019 | Seaman et al. | |
| 2019/0069139 A1 | 2/2019 | Seaman et al. | |
| 2019/0147398 A1* | 5/2019 | White | G06Q 10/0838 705/333 |
| 2020/0160722 A1* | 5/2020 | Brugman | H04W 4/46 |

OTHER PUBLICATIONS

European Patent Office, Communication pursuant to Article 94(3) EPC for Appl. No. 20172305.3 dated Aug. 4, 2021 (5 pages).

* cited by examiner

SYSTEM AND METHOD FOR CARGO TRANSPORTATION UNIT TRACKING AND MONITORING DEVICE VERIFICATION

TECHNICAL FIELD

The present disclosure relates to tracking and monitoring devices (TMDs) for cargo transportation units (CTUs) and in particular to the verification of and association of the CTU to the TMD.

BACKGROUND

Various technologies exist for tracking and monitoring of cargo transportation units (CTUs) during transport or shipment of cargo. These technologies utilize various types of sensors, location-determining devices such as global positioning system (GPS) units, and anti-theft monitors. These sensors, units and monitors may be wirelessly linked to a remote computing device to enable a user of the remote computing device to remotely monitor the status of the cargo or container while it is transported.

When installing the TMD, the customer and installer must manually write down the CTU identifier (e.g. ID number painted on cargo transportation units) and match the CTU ID to the product identifier for TMD. However, the manual processes is prone to introduce human error. A mismatch between the CTU ID and the TMD can result in lost cargo or financial loss due to delays.

Accordingly, systems and methods that enable cargo transportation unit tracking and monitoring device verification remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
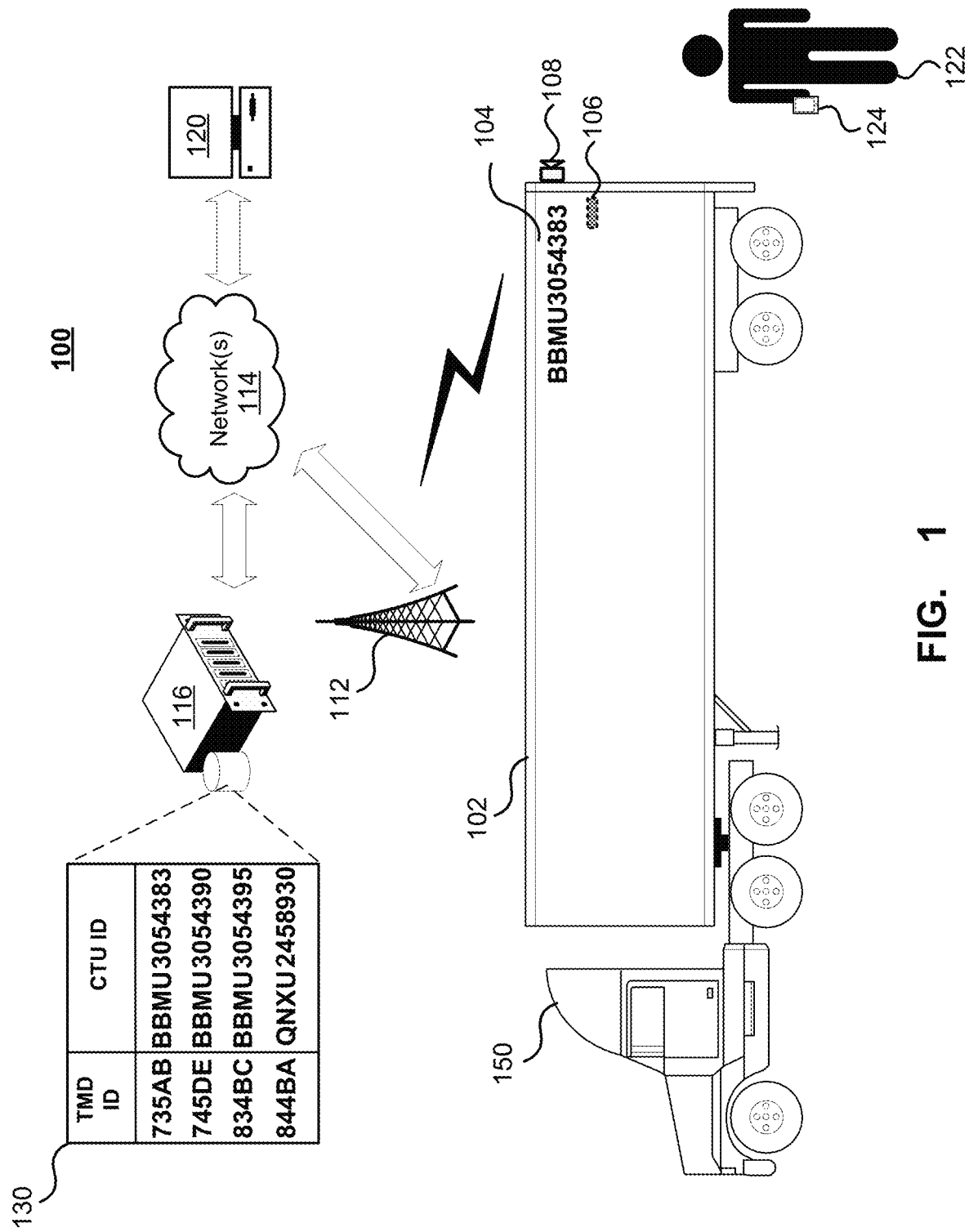
FIG. 1 shows a representation of CTU and a tracking and monitoring system.

Embodiments are described below, by way of example only, with reference to FIGS. 1-7.

In accordance with an aspect of the present disclosure there is provided a method of cargo transportation unit (CTU) identifier association verification, the method executed at a server coupled to a network, the method comprising: receiving a CTU identifier through the network provided from using a first tracking and monitoring device (TMD) associated with a first CTU, receive location of first TMD; determining if an association is defined between the received CTU identifier of a second CTU with a second TMD; receiving a location of the second TMD if the association between the second TMD and the second CTU is defined; and verifying the association of the second TMD and second CTU based on the relative locations of the first TMD to the second TMD.

In accordance with another aspect of the present disclosure there is provided a system for verifying an association between a cargo transportation unit (CTU) and a tracking and monitoring device (TMD), the system comprising: a network interface; and a processor coupled to the network interface; a memory coupled to processor, the memory containing instructions for execution by the processor for receiving through the network from a first TMD associated with a first CTU, a CTU ID of a second CTU, wherein the system verifies the association of the second CTU with a second TMD using the location of the first TMD and second TMD.

In accordance with still yet another aspect of the present disclosure there is provided a computer readable non-transitory memory containing instructions for verifying an association between a cargo transportation unit (CTU) and a tracking and monitoring device (TMD), the instructions executed at a server coupled to a network which when executed by a processor perform a method of: receiving a CTU identifier (ID) through the network provided from using a first tracking and monitoring device (TMD) associated with a first CTU, determining if an association is defined between the received CTU ID of a second CTU with a second TMD; receiving a location of the first TMD and the second TMD if the association between the second TMD and the second CTU is defined; and verifying the location of the second TMD and second CTU based on the relative locations of the first TMD to the second TMD.

In accordance with still yet another aspect of the present disclosure there is provided a method of cargo transportation unit (CTU) identifier association verification, the method executed on a tracking and monitoring device (TMD), the method comprising: detecting a trigger at the TMD associated with a first CTU, capturing an image by a camera coupled to TMD on the exterior of the CTU, the image encompassing a second CTU, determining a location associated with the TMD of the first CTU, and transmitting an identifier and location to a server coupled to a network.

In the installation process of a tracking and monitoring device (TMD) unit on a cargo transportation unit (CTU), a manual process may be performed by the customer by printing out a matrix/spreadsheet of all their un-assigned CTUs. Each TMD unit can have a peel and stick sticker of its identifier which is matched by the installer with the correct CTU. This process eliminates transcription errors, however the installer can still place the sticker in the wrong row/column by mistake. In addition, errors may occur during transport, maintenance or due to theft where the CTU ID does not match the TMD unit, or may not have an associated TMD unit at all. Alternatively, a mobile application may be utilized to take pictures for validation and automation however this process is still prone to operator error.

FIG. 1 shows a representation of a CTU tracking and monitoring system. The system 100 is described with particular reference to a transport truck 150 and CTU 102, however, it will be apparent that the same or similar system 100 may be used in other environments that require remote tracking of assets. The system 100 comprises a TMD 106 that is physically associated with the CTU 102. The TMD 106 may be secured to an interior or exterior portion of the CTU 102 which allows the TMD 106 to monitor conditions within the interior of the CTU 102 and also connect to an exterior camera. The TMD 106 may also include a number of internal or external sensors for monitoring the interior of the trailer. The internal sensors may include, for example temperature sensors, humidity sensors, light sensors, imaging sensors, microphones, accelerometers, gyroscopes and/or GPS receivers. The sensors can monitor the state of the CTU 102, such as the temperature as well as the location of the CTU 102. The TMD 106 may include a long range radio frequency (RF) radio, such as a satellite or cellular radio such as a 3G, 4G, 5G, etc. radio. The TMD 106 may also include an externally mounted antenna (not shown) for the radio in order to improve reception of RF signals. The TMD 106 monitors and communicates wirelessly status information to one or more servers provided remote locations.

It may be desirable to connect additional sensors to the TMD 106 to improve the monitoring abilities of the TMD, or to add new monitoring abilities. For example, a number of external temperature sensors may be placed throughout the CTU 102, tire pressure sensors may be connected to the trailer tires, or internal or external cameras 108 may be paired to monitor the internal or external environment. The TMD 106 may establish a wireless connection with each of the sensors or camera in order to provide communication channels to periodically receive the monitored data over. The wireless connection can be established using a short range communication RF radio such as Bluetooth™, ZigBee™, and Z-Wave™ or wired directly to the TMD 106.

The TMD 106 may communicate data, including for example monitored sensor data from both internal and external sensors as well as notifications or processed information from the TMD 106, using a cellular infrastructure 112 and network infrastructure 114 to a tracking and monitoring server 116. The monitoring server 116 may provide a back-end server for monitoring data from multiple TMDs. In a basic implementation, the tracking and monitoring server may be provided by a web server, such as Apache™ or NGINX™, that receives data from TMDs using an HTTP POST request and stores the received data to a file. Further functionality may be provided, for example by storing received data in a database or similar technology. The monitored data may also be processed to identify possible issues or events. Additionally or alternatively the notifications may be sent to an administration terminal 120. It will be appreciated that various monitoring and data processing functionality may be provided to meet the particular requirements of a given application.

The TMD 106 is associated with a particular CTU 102. The CTU 102 has an identification number 104 which is associated with a TMD 106 ID and stored in the server 116. The identification number provides a unique identifier on the exterior of the CTU 102. In associating the CTU ID with the TMD ID a manual process may be performed by a technician 122 to identify the CTU ID and the installed TMD ID which is stored in the association table 130. The association between the identifiers is used to track and monitor the CTU and the associated cargo but is prone to errors.

In a semi-automated process the technician 122 may use a mobile device 124 to communicate the IDs over the cellular infrastructure 112 and the network infrastructure 114 to a tracking and monitoring server 116. The technician 122 can for example by scanning an optical machine-readable representation of data, such as a barcode or QR code (referred to further below simply as barcode for brevity), associate the TMD that should be connected to a particular CTU. The IDs can be communicated from the mobile device 124 to the tracking and monitoring server 116, which can then communicate and match the TMD ID to the associated CTU ID. However an automated process may be utilized to perform the association of the CTU to TMD or verify previously made associations.

Once the TMD ID is identified, it is used to determine communication details for communicating with the particular TMD. For example, the communication details may include a network provider, network address, such as an Internet Protocol (IP) address, as well as other details such as encryption information, communication protocols, ports, etc. The information may be stored in an association table or TMD record, or other data storage structure, depicted schematically by association table 130.

Figure 2:
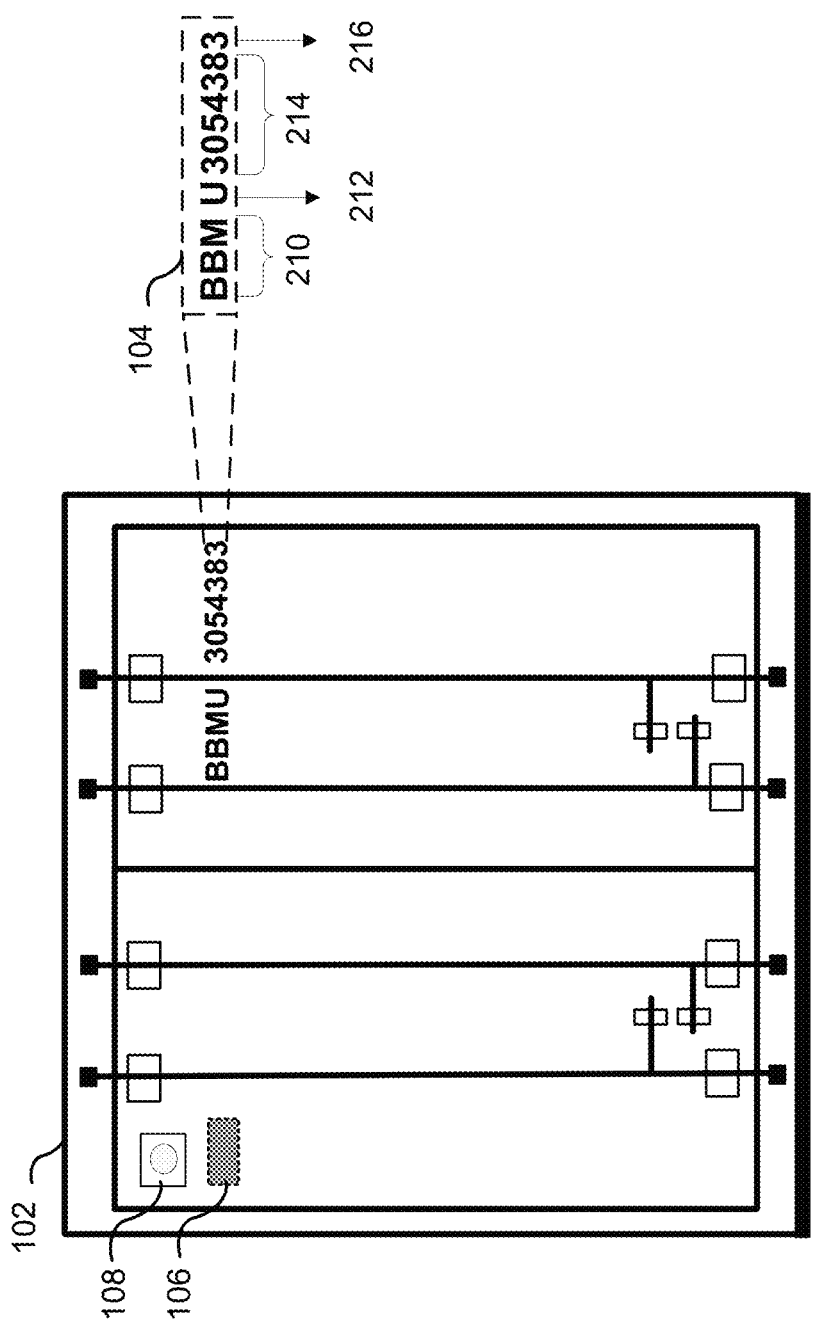
FIG. 2 shows a representation of a rear of a CTU and the CTU ID represented thereon.

FIG. 2 shows a representation of a rear of a CTU 102 and the CTU ID 104 represented thereon. The CTU, such as a cargo container, will have an external identifier 104 for example as defined by ISO 6346 which covers the coding, identification and marking of intermodal (shipping) containers used within containerized intermodal freight transport. The standard establishes a visual identification system for every container that includes the owner 210, category identifier 212, and unique serial number 214 with a check digit 216. The formatting may vary for different applications. The identification may be visible on multiple sides of the CTU. The identifier 104 is associated with the TMD 106 having a unique serial number to facilitate tracking. Alternatively, the CTU may be associated with a trailer identifier, such as a licensee plate which can be used as the CTU ID for the purposes of this description.

Figure 3:
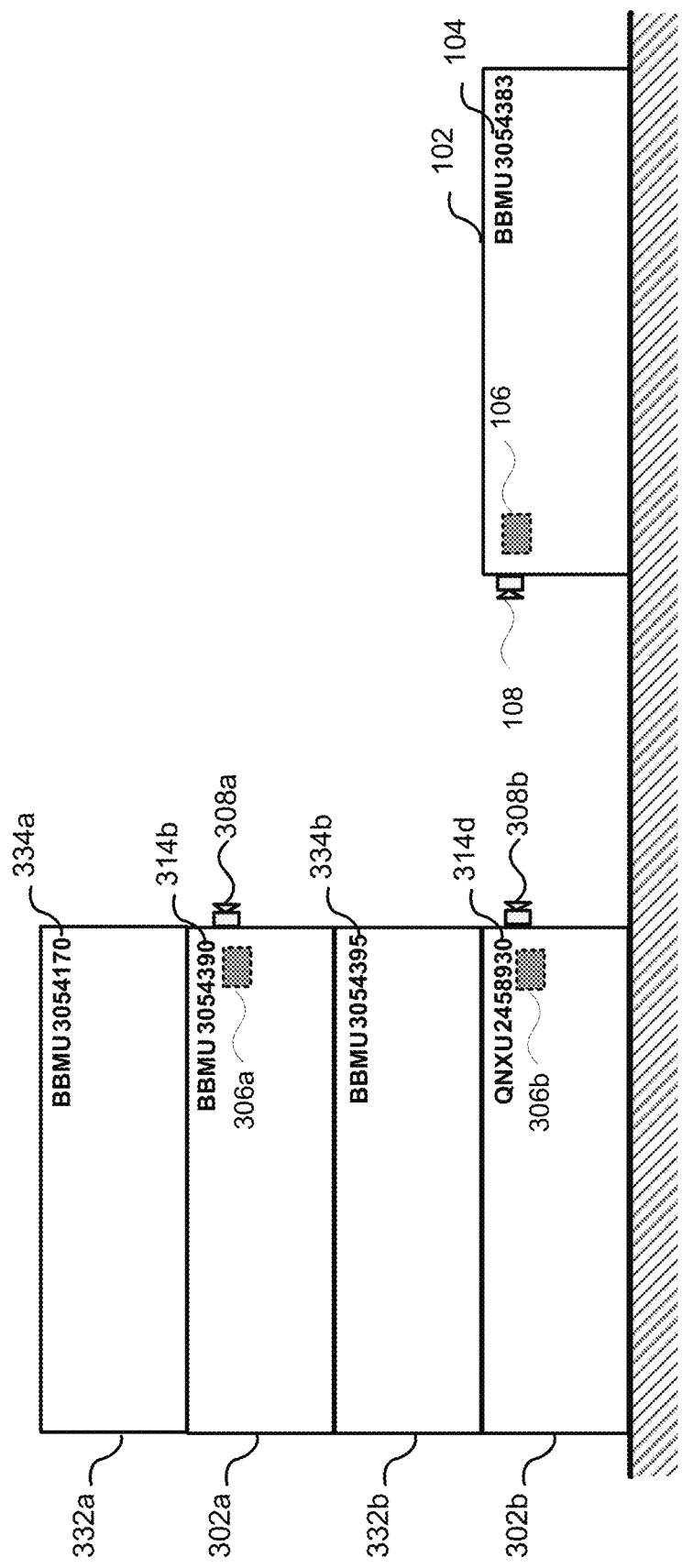
FIG. 3 shows a representation of CTU ID and TMD verification with multiple CTUs.

FIG. 3 shows a representation of CTU identification and TMD verification with multiple CTUs. Once the TMD 106 is associated with a specific container identifier 104, movements of the CTU 102 can be monitored and tracked by the TMD 106 sending location information to the monitoring server 116. However during configuration manual errors in the peel and stick process causing incorrect association between the CTU and TMD or during the data collection or entry process. By utilizing cameras 108, 308a, 308b mounted on the CTUs 102, 302a, 302b and associated with a TMD 106, 306a, 306b, the system can provide confirmation of location and association of the TMDs having CTU IDs that are co-located or within the same geographic region. The system can also verify CTUs 332a, 332b not having associated TMDs and their position by capturing an image of nearby containers by camera 108, determining an identifier 334a, 314b, 334b, 314d associated with the respective containers 332a, 302a, 332b, 302b and sending a message to the tracking and monitoring server 116 which can verify the expected location and/or associated TMD of that particular CTU. The tracking and monitoring server may also request confirmation from the associated TMD 306a of the CTU 302a of a location to compare the identified position with the reported position. The system enables nearby CTUs location and/or TMD associations to be validated either on installation or during transit. TMDs having associated cameras may provide periodic or triggered image capture of their surroundings to identify nearby CTU IDs. In the case of a detected mismatch between CTU and its TMD, a CTU that doesn't follow the GPS location of the reported shipping route, when the mismatch CTU reports a GPS location near one of the CTUs with a camera, the server can trigger the camera to take an image in an attempt to identify the CTU IDs. The image capture may also be triggered by movement of the associated CTU, detection of movement exterior of the CTU, or by events detected by sensors associated with the CTU, such as light sensor, accelerometer, GPS, sound, or wireless emissions.

The trigger for initiating image capture may also consider the weather conditions (streamed from a weather service), so it avoid capturing images during poor weather or poor lighting conditions. For example, images may be taken during daylight hours as night images will produce a low quality image that can result errors in the image recognition process. The CTU identifiers can be detected by an image recognition process on the TMD unit, or the unprocessed images can be provided to the tracking and monitoring server 116. The images may be processed from TMDs and CTUs that are known or verified to the tracking and monitoring server 116. Questionable or low quality images may be further verified by an operator of the tracking and monitoring server 116, or a request may be generated for additional images be acquired by the TMD unit or surrounding TMD units.

Upon an installation of a TMD unit onto a CTU, the new TMD unit when powered on requests, via server or local area network, a location confirmation, that other TMD units in the area take an image to determine if other trailers or CTUs that are in co-located or within a geographic region of the CTU can be validated that it has an associated TMD unit. Alternatively, the server may initiate image acquisition by other TMD units when the new TMD unit is associated with a particular CTU during commissioning of the new TMD unit. Optical recognition can be utilized on the TMD or the server to see the CTU ID or license plate of the trailer or CTU. Location co-ordinates provided by a positioning system such as Global Positioning System (GPS) are utilized to validate the association of TMD to the CTU. If the location resolution is not sufficiently accurate local area network triangulation may be utilized to further refine the location.

Alternatively, once the CTU pool 102, 302a, 302b are located in a particular area that has sufficient camera coverage density (such as for example 15-20%) the same process can be used to identify devices and trailers automatically to the initial installation process. If an association between a CTU and TMD unit cannot be determined from an image, e.g. too close to another unidentified unit, then the system can wait for a motion/change in the yard and try again to determine an association. Images from multiple units can be used to determine unverified CTUs in the local area. A TMD unit may also be utilized at an identification gate, cargo container crane, or forklift to capture images of CTUs as they enter or exit a yard. The TMD unit would provide an image of a CTU to enable the server to determine CTU ID and if a TMD unit is associated with the CTU and correlate to TMD unit position data.

TMDs may be removed from a CTU during maintenance or swapped to other CTUs. The server/system can detect incorrect associations between motion events and CTUs that should be moving based on tracking and monitoring system (TMS) data. For example, the TMS system 116 says that CTU 102 should be travelling from location A to location B, but instead the TMS identifies that CTU XYZ is making the trip. Verification if the TMD unit moved from CTU 102 to XYZ can then be verified when the CTU 102 stops in a yard where TMDs 302a, 302b are in the area and can be used to validate the association. If the TMD system 116 detects that all the trips assigned to CTU 102 are always reported by CTU XYZ a confidence factor can be utilized. For example, if this happen 2 or 3 times, it is most likely the labels are wrong and should be identified to be checked. However, if this happen one time only, it may be an incorrect allocation on the shipment system 116 of CTU 102 to this shipment. Also, in the scenario where the system 116 determines that CTU 102 is moving which it is not supposed to move, it can be flagged that TMD ID labels have been swapped between CTU 102 and XZY, not just incorrectly labeled.

Figure 4:
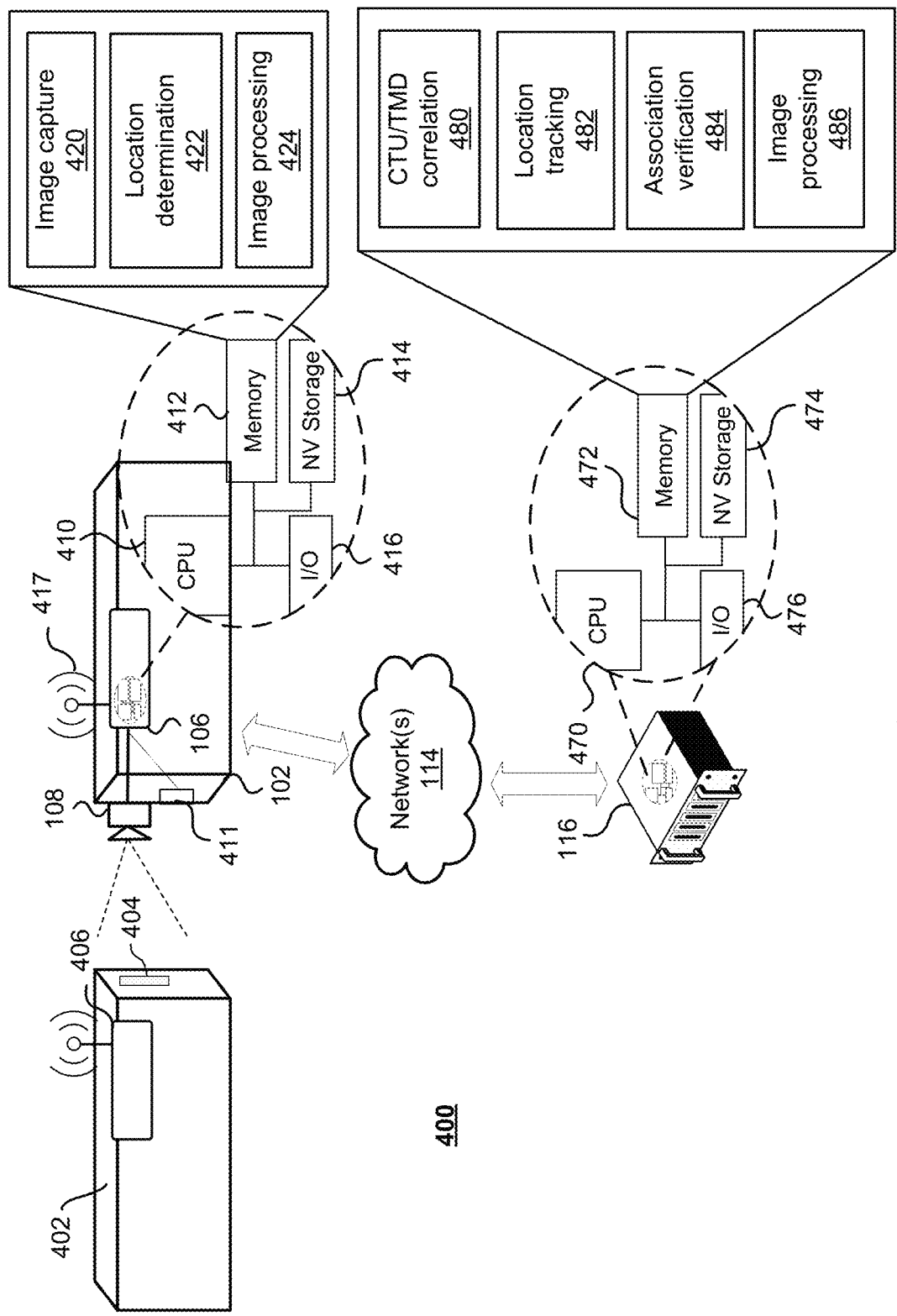
FIG. 4 shows a system for CTU identification and TMD verification.

FIG. 4 shows a system 400 for CTU identification and tracking and monitoring device verification. A CTU 402 having an identifier 404 may or may not have a TMD associated with it. A TMD 106 which is associated with another CTU 102 can take an image of the CTU 402 by a camera 108 coupled to the TMD 106. The TMD 106 comprises at least a processing unit 410, memory 412, non-volatile (NV) storage 414 for permanent or semi-permanent storage of data and instructions and data, input/output interface 416, and a plurality of radios 417. One or more sensors 411 may be also provided which may be separate components in the TMD 106 or integrated within the camera 108 or the processing unit 410. The radios 417 include both a short range radio for communicating with sensors 411 as well as a long range radio for communicating with remote servers. The short range radios may be one or more radios such as for example a Bluetooth™ radio, ZigBee™ radio, or Z-Wave™ radio. The long range radios may be one or more wide area radios such as for example a satellite radio, 3G, 4G, or 5G cellular radios. The memory 412 contains computer executable code for instructing the processor 410 from enabling image capture 420, location determination 422 through GPS or wireless triangulation means and optionally image processing 424 for extracting identifier 104 from images that are captured. Either the captured images or extracted identifiers are transmitted via a transmitter of the TMD 106.

The tracking and monitoring server 116 receives the images or identifiers from the TMD 106. The server 116 comprises one or more processors 470, memory 472, non-volatile storage 474 and input/output interface 476. The server 116 communicates with the TMD 102 via a wireless communications network connected thereto. The memory 472 contains computer readable instructions for execution by the processor 470 to provide CTU/TMD correlation 480 functionality such as table 130, location tracking 482 for monitoring the location of CTU and TMDs, association verification between TMD and CTU IDs 484 and optionally image processing 486. The image processing 486 may process images to extract CTU ID and match them to location information either provided with from the TMD or extracted from within the image.

Figure 5:
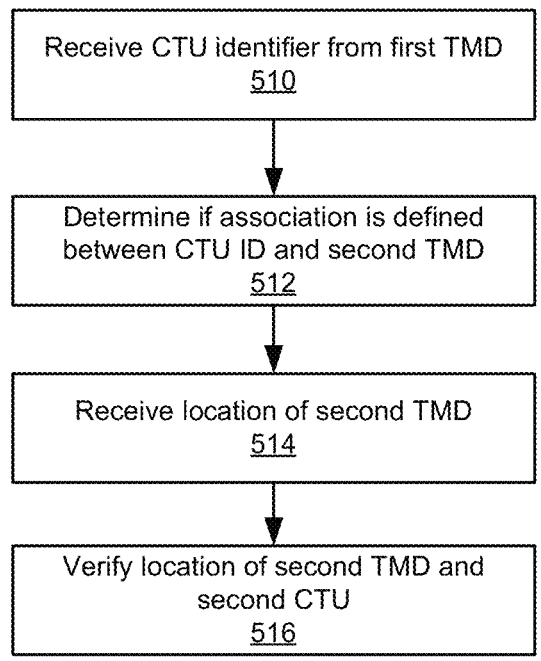
FIG. 5 shows a method of cargo transportation unit (CTU) identifier association verification performed at a server.

FIG. 5 shows a method of cargo transportation unit (CTU) identifier association. The server 116 receives a CTU ID 404 from a first TMD 106 (510) through a wireless network. The TMD 106 is triggered to capture an image of its surroundings by a trigger such as a request from the server 116, detection of movement in the surroundings or CTU 102, or a GPS position update. The TMD 106 can send CTU IDs 404 that were identified within the image by the TMD 106, or can provide the actual image captured by the TMD 106 for processing by the server 116. The server 116 can then determine if there is an association between the identified CTU ID 404 and a second TMD 406 within the system (512). If there is a paring in an association database the location of the second TMD is received (514). The location of the second TMD 406 may be requested by the server, previously stored, or provided periodically by the TMD 406 to the server 116 depending on polling configurations. The location of the first TMD 106 can then be compared with the location of the second TMD 406 to verify the second CTU ID 404 and TMD 406 are at the correct location (516). If the CTU ID 404 is associated with the server 116 but does not have a TMD association, the location information of the CTU 402 can be updated using the location information provided by the first TMD 106. Alternatively, CTU IDs that are not associated with the server 116 can be ignored and mismatches in locations between CTU IDs and TMDs can also be identified.

Figure 6:
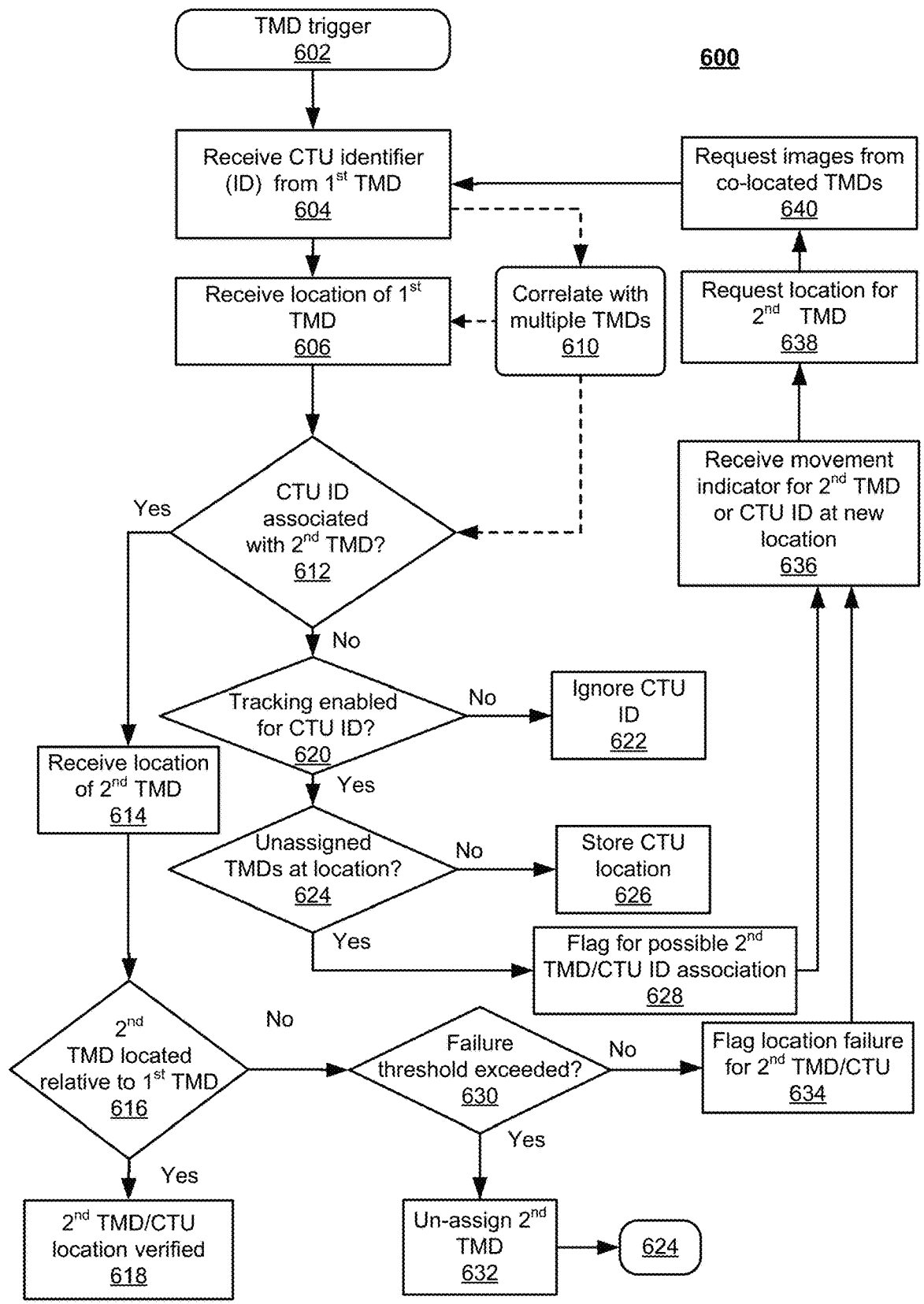
FIG. 6 shows an alternative method of CTU ID association.

FIG. 6 shows a method of cargo transportation unit (CTU) identifier association verification performed at a server. A TMD trigger to capture images or identifiers is either generated by the server 116 or self initiated by the TMD (602). A CTU ID, or an associated image, is received by the server from the first TMD (604) through one or more communication networks. The image provides an external view of the associated CTU to show the surrounding geographic area and other CTUs such as within a cargo yard or shipping vessel. If there are multiple TMDs in the area additional images may be requested or processed to aid in correlation (610). Location information from the first TMD, and other surrounding TMDs if required, are received (606). The received CTU ID is verified in an association database to determine if there is an associated second TMD (612) for the CTU. If the CTU ID does not have a TMD association (NO at 612), it is then determined if tracking should be provided for the CTU ID (620). For example, TMDs may only be associated with a percentage of the total CTUs tracking within the system, but tracking can be provided by leveraging the CTUs which have associated TMDs. If CTU tracking is not enabled (NO at 620) the CTU ID can be ignored (622) as it may be from another owner or operator. If the CTU tracking is enabled (YES at 620) it can then be determined if there are unassigned, or miss-assigned TMDs within the same location (624). The unassigned or miss-assigned TMD may occur during installation of the TMD units, confirmation, or during maintenance operations on the TMD or association database. If there are no unassigned TMD (NO at 624), or CTU should not have a TMD association, the location information provided by the first TMD can be associated with the CTU ID (626). If there are unassigned TMDs (YES at 624) a flag for possible second TMD/CTU ID association may be enabled to request further verification (628) of the association by additional images, time periods, location updates, or physical verification can be initiated. Alternatively, the association may be later changed based upon future updates.

If the CTU ID has an association with a second TMD (YES at 612) the location of the second TMD can be requested by the server (614) or determined from the latest position update provided by the associated TMD. If the second TMD location is co-located, within a defined geographic region or range, relative to the first TMD (Yes at 616), that is within a define margin of error, the second TMD and CTU association and location can be marked as verified (618). If the second TMD location is not consistent with the first TMD location (No at 616), a failure threshold may be optionally utilized to minimize erroneous reporting (630). If the threshold has been exceeded (YES at 630), i.e. the association has not been verified after three attempts at different locations, or a threshold is not utilized, the second TMD can be un-unassigned (632) from the CTU and an attempt may be made to associate it with additional TMDs in the area (624). If a failure threshold is utilized and has not been exceed (NO at 630) a location failure may be flagged for the second TMD/CTU pairing (634). A threshold value may enable verification of operation of a TMD by a technician if the location cannot be verified, for example if the TMD has become damaged lost power or has been removed.

When a position update information is provided for the second TMD identifying that it has moved or is at a new location by the first TMD or based upon routing information in the system (636) the server can trigger a request for location information of the second TMD (638). The location information can then be provided by the second TMD which can then trigger a request for images from co-located TMDs at the new location (640) to verify its new location. Alternatively the second TMD may provide images which is utilized to the presence of other known CTU IDs as the location.

In an installation situation the process may be executed without a defined CTU/TMD association where the location of the CTU can be independently confirmed. However, it may be identified that a TMD should be associated with the CTU. Similarly, locations may be associated with CTU that don't have a TMD, but may be identified in the tracking and monitoring server particular if they are associated with an owner or operator of the CTUs that is utilizing the system.

Figure 7:
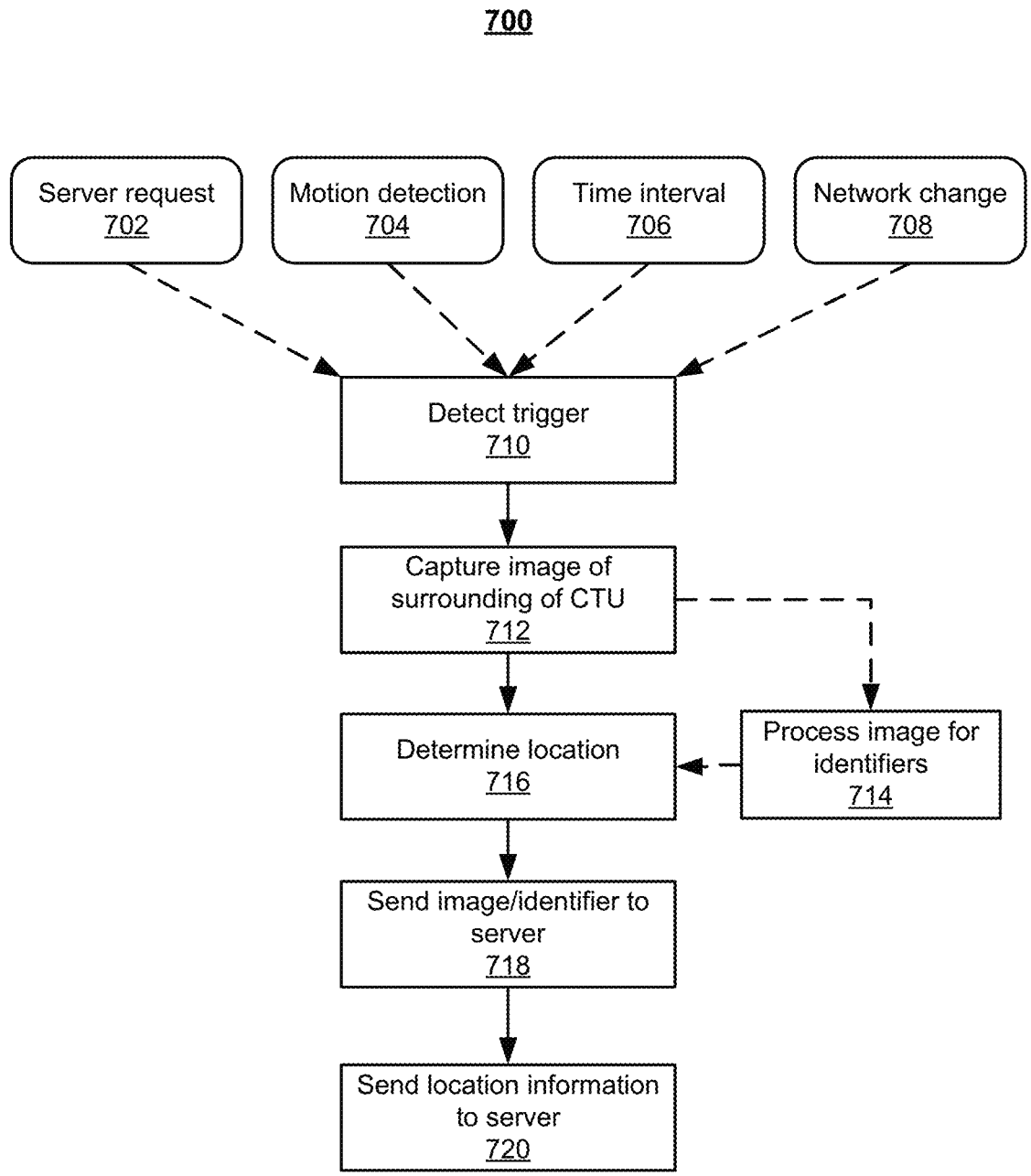
FIG. 7 shows a method of cargo transportation unit (CTU) identifier association verification, the method executed on a tracking and monitoring device (TMD).

FIG. 7 shows a method of cargo transportation unit (CTU) identifier association verification, the method is executed on a tracking and monitoring device (TMD). The TMD initiates the process by receiving a trigger (710). The trigger can be provided by the server (702), by motion detection by the TMD (704), at a predefined time interval (706) or when a network change or RF environment change is detected (708). Other triggers may be contemplated to initiate the process on the TMD, in addition, the process may require the TMD to have sufficient power or signal connectivity to perform the process. Images by the external camera of the TMD can then be captured (712). The images may be processed by the TMD to extract CTU identifiers, or the images may be provided to the server (714) for processing by the server to extract CTU IDs. The location of the TMD is determined by GPS (716). The location information of the TMD may be sent with the image, or extracted CTU ID (718), or may be sent separately (720). If operational conditions do not allow for transmission of the image or CTU IDs by the TMD, for example low battery or poor network connectivity, they may be stored and later transmitted when conditions are more favourable.

The above has described a system, devices, and methods for verifying a tracking and monitoring device to a cargo transportation unit. The system, devices and methods have been described with particular reference to a cargo transport application. The system may be used in other transport related applications, in which a cargo transportation unit is physically associated with a TMD. The transportation platform may be any transportation device that capable of being tracked by a TMD. Although the description is described with respect to CTUs, it may be utilized in asset tracking and monitoring for assets such as construction equipment.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. The techniques of various embodiments may be implemented using software, hardware and/or a combination of software and hardware other than the specific implementations described herein as illustrative examples.

Many of the above described methods or method steps can be implemented using machine executable instructions, such as software, included in a machine readable medium such as a memory device, e.g., RAM, non-volatile memory, etc. to configure a machine, e.g., general purpose computer with or without additional hardware, to implement all or portions of the above described methods. Accordingly, among other things, various embodiments are directed to a machine-readable medium e.g., a non-transitory computer readable medium, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device.

It would be appreciated by one of ordinary skill in the art that the system and components shown in FIGS. 1-7 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method executed at a server coupled to a network, the method comprising:
   receiving, at the server, a tracking and monitoring device (TMD) identifier of a first TMD associated with a first cargo transportation unit (CTU);
   determining, by the server based on the TMD identifier, communication details to communicate with the first TMD, the communication details comprising a network address and a communication protocol;
   sending, from the server over the network using the communication details comprising the network address and the communication protocol, a trigger to the first TMD associated with the first CTU, the trigger to cause the first TMD to acquire an image using a camera coupled to the first TMD;
   receiving, at the server over the network from the first TMD, information of an acquired CTU identifier, the acquired CTU identifier extracted from the image based on an image recognition process performed on the image;
   receiving, at the server, a location of the first TMD;
   determining, at the server, if there is an existing association defined in an association database between a second CTU having the acquired CTU identifier and a second TMD;
   receiving, at the server, a location of the second TMD if the existing association between the second TMD and the second CTU is defined in the association database; and
   verifying, at the server, the existing association between the second TMD and second CTU having the acquired CTU identifier stored in the association database based on the locations of the first TMD and the second TMD.

2. The method of claim 1, wherein receiving the information of the acquired CTU identifier comprises:
   receiving the image over the network from the first TMD, the method comprising:
   determining the acquired CTU identifier by performing the image recognition process at the server on the image received from the first TMD.

3. The method of claim 1, wherein receiving the information of the acquired CTU identifier comprises receiving the acquired CTU identifier extracted by the first TMD from the image based on the first TMD performing the image recognition process on the image.

4. The method of claim 1, wherein the location of the first TMD and the location of the second TMD are based on location data from respective Global Positioning System (GPS) receivers associated with the first TMD and the second TMD.

5. The method of claim 4, wherein the location of the first TMD and the location of the second TMD are verified based upon a distance range defined for the camera and a margin of error associated with the location data from the respective GPS receivers.

6. The method of claim 1, further comprising:
   detecting a movement of the second CTU associated with a second CTU identifier matching the acquired CTU identifier;
   determining a second location of the second TMD resulting from the movement;
   determining one or more TMDs at the second location;
   receiving a captured CTU identifier associated with the second CTU from at least one of the one or more TMDs determined to be at the second location; and
   verifying that the captured CTU identifier associated with the second TMD matches the second CTU identifier already associated with the second CTU.

7. The method of claim 1, further comprising:
   detecting a movement of the second TMD associated with a second CTU identifier matching the acquired CTU identifier;
   determining a second location of the second TMD resulting from the movement;
   determining one or more TMDs within a defined geographic region associated with the second location;
   requesting and receiving a captured CTU identifier from at least one of the one or more TMDs determined to be within the defined geographic region;
   matching the second CTU identifier to the captured CTU identifier received from a particular TMD of the at least one of the one or more TMDs; and
   verifying a location of the second CTU and the second TMD relative to a location of the particular TMD.

8. The method of claim 1, wherein if the acquired CTU identifier is not associated with a respective TMD, the method comprises associating, by the server, the received location of the first TMD with the acquired CTU identifier.

9. The method of claim 1, wherein if the acquired CTU identifier is not associated with a respective TMD, the method comprises determining a location of at least one TMD located in proximity to a CTU not having a respective TMD, and associating the at least one TMD with the acquired CTU identifier.

10. The method of claim 1, wherein the first TMD is mounted to the first CTU, and the first TMD has a wireless interface for communicating with the server.

11. The method of claim 1, wherein the acquired CTU identifier is an ISO 6346 compliant identifier.

12. A server comprising:
a network interface;
a processor coupled to the network interface; and
a non-transitory storage medium coupled to the processor and containing instructions executable on the processor to:
receive, at the server, a tracking and monitoring device (TMD) identifier of a first TMD associated with a first cargo transportation unit (CTU);
determine, based on the TMD identifier, communication details to communicate with the first TMD, the communication details comprising a network address and a communication protocol;
send, from the server over a network using the communication details comprising the network address and the communication protocol, a trigger to the first TMD associated with the first CTU, the trigger to cause the first TMD to acquire an image using a camera coupled to the first TMD;
receive, at the server over the network from the first TMD, information of an acquired CTU identifier of a second CTU, the acquired CTU identifier extracted from the image based on an image recognition process performed on the image;
determine if there is an existing association defined in an association database between the second CTU having the acquired CTU identifier and a second TMD; and
verify the existing association of the second CTU with the second TMD using a location of the first TMD and a location of the second TMD.

13. The server of claim 12, wherein the information of the acquired CTU identifier includes the image, and wherein the instructions are executable on the processor to:
determine the acquired CTU identifier by performing the image recognition process at the server on the image.

14. The server of claim 12, wherein the information of the acquired CTU identifier includes the acquired CTU identifier derived by the first TMD from the image based on the first TMD performing the image recognition process on the image.

15. The server of claim 12, wherein the locations of the first TMD and the second TMD comprise Global Positioning System (GPS) location data.

16. The server of claim 12, wherein the instructions are executable on the processor to:
detect a movement of the second TMD;
determine a second location of the second CTU from a third TMD at the second location; and
verify an association between the second CTU and the second TMD.

17. The server of claim 12, wherein the instructions are executable on the processor to:
detect a movement of the second TMD;
determine a location of the second TMD; and
verify the second CTU by receiving an image from a third TMD at the determined location.

18. The server of claim 12, wherein the second CTU is identified by a plurality of images received by a plurality of TMDs.

19. The server of claim 12, wherein the acquired CTU identifier is an ISO 6346 compliant identifier.

20. A computer readable non-transitory storage medium comprising instructions that when executed at a server cause the server to:
receive, at the server, a tracking and monitoring device (TMD) identifier of a first TMD associated with a first cargo transportation unit (CTU);
determine, based on the TMD identifier, communication details to communicate with the first TMD, the communication details comprising a network address and a communication protocol;
send, from the server over a network using the communication details comprising the network address and the communication protocol, a trigger to the first TMD associated with the first CTU, the trigger to cause the first TMD to acquire an image using a camera coupled to the first TMD;
receive, at the server over the network from the first TMD, information of an acquired CTU identifier (ID) based on the image, the acquired CTU identifier extracted from the image based on performing an image recognition process on the image;
determine if there is an existing association defined in an association database between a second CTU having the acquired CTU identifier and a second TMD;
receive a location of the first TMD and a location of the second TMD in response to the existing association between the second TMD and the second CTU being defined in the association database; and
verify the existing association between the second TMD and second CTU having the acquired CTU identifier stored in the association database based on the locations of the first TMD to the second TMD.

* * * * *